(12) United States Patent
Yu (10) Patent No.: US 11,855,396 B2
(45) Date of Patent: Dec. 26, 2023

(54) POWER ADAPTER WITH LIGHTNING FEMALE SOCKET, CHARGING DEVICE AND SYSTEM

(71) Applicant: SHENZHEN ZHIYOU PRECISE ELECTRONICS CO., LTD, Shenzhen (CN)

(72) Inventor: Zhiyou Yu, Shenzhen (CN)

(73) Assignee: SHENZHEN ZHIYOU PRECISE ELECTRONICS CO., LTD, Shenzhen (CN)

( * ) Notice: Subject to any disclaimer, the term of this patent is extended or adjusted under 35 U.S.C. 154(b) by 37 days.

(21) Appl. No.: 17/701,697

(22) Filed: Mar. 23, 2022

(65) Prior Publication Data

US 2022/0416488 A1 Dec. 29, 2022

Related U.S. Application Data

(63) Continuation of application No. PCT/CN2021/134340, filed on Nov. 30, 2021.

(30) Foreign Application Priority Data

Jun. 29, 2021 (CN) .......................... 202110724174.2
Sep. 3, 2021 (CN) .......................... 202111034355.9

(51) Int. Cl.
*H01R 31/06* (2006.01)
*H01R 13/502* (2006.01)
(Continued)

(52) U.S. Cl.
CPC ........... *H01R 31/06* (2013.01); *H01R 13/502* (2013.01); *H01R 13/665* (2013.01); *H01R 24/60* (2013.01);
(Continued)

(58) Field of Classification Search
CPC .... H01R 31/06; H01R 13/502; H01R 13/665; H01R 24/60; H01R 27/02; H01R 2107/00
(Continued)

(56) References Cited

U.S. PATENT DOCUMENTS 7,756,268 B2 * 7/2010 Hazani ................. H01R 13/719
379/413.04
8,834,210 B2 * 9/2014 Brausen ............ H01R 13/7135
439/718
(Continued)

FOREIGN PATENT DOCUMENTS

CN 103066340 A 4/2013
CN 206992755 U 2/2018
(Continued)

*Primary Examiner* — Alexander Gilman (57) ABSTRACT

A power adapter with a Lightning female socket includes a main body and a housing, a Lightning female socket and an adapter unit on the main body, the Lightning female socket being electrically connected to the adapter unit; the housing being provided with an opening communicated to the Lightning female socket, the housing being sleeved on an exterior of the main body, and making the opening correspond to the Lightning female socket; the adapter unit being capable of providing electrical energy directly or indirectly to the Lightning female socket and outputting voltage and current outwardly through the Lightning female socket. By designing a power adapter with a Lightning female socket, a charging device and system, communication with an external terminal device and charging to the outside is achieved through the Lightning female socket.

20 Claims, 5 Drawing Sheets

(51) Int. Cl.
  *H01R 24/60* (2011.01)
  *H02J 7/00* (2006.01)
  *H01R 13/66* (2006.01)
  *H01R 27/02* (2006.01)
  *H01R 107/00* (2006.01)

(52) U.S. Cl.
  CPC .......... *H01R 27/02* (2013.01); *H02J 7/00034* (2020.01); *H01R 2107/00* (2013.01)

(58) Field of Classification Search
  USPC .......................................................... 439/105
  See application file for complete search history.

(56) References Cited

U.S. PATENT DOCUMENTS

| | | | | |
|---|---|---|---|---|
| 9,391,467 | B2* | 7/2016 | Zhao | H02J 7/007184 |
| 10,727,731 | B1* | 7/2020 | King | H01R 13/6675 |
| 10,756,644 | B1* | 8/2020 | Shah | H02M 3/07 |
| 10,917,922 | B2* | 2/2021 | Proschowsky | G06F 13/4282 |
| 10,958,020 | B1* | 3/2021 | King | H01R 31/065 |
| 2014/0070774 | A1* | 3/2014 | Terlizzi | H02J 7/00047 |
| | | | | 320/137 |
| 2014/0312856 | A1* | 10/2014 | Burrell | H05B 45/14 |
| | | | | 323/234 |
| 2015/0212967 | A1* | 7/2015 | Griffin | H04W 4/80 |
| | | | | 710/304 |
| 2017/0293335 | A1* | 10/2017 | Dunstan | G06F 13/4022 |
| 2017/0302045 | A1* | 10/2017 | Wang | H01R 43/205 |
| 2017/0374188 | A1* | 12/2017 | Chalabi | H04M 1/72409 |
| 2019/0081426 | A1* | 3/2019 | Chavakula | H01R 13/6691 |
| 2019/0288532 | A1* | 9/2019 | Mattos | H02J 7/00 |
| 2019/0372387 | A1* | 12/2019 | Wan | H02J 7/0068 |
| 2020/0241891 | A1* | 7/2020 | Li | G06F 8/65 |
| 2020/0339265 | A1* | 10/2020 | Yilmaz | H01R 25/006 |
| 2020/0341036 | A1* | 10/2020 | Liu | G01R 19/16538 |
| 2022/0416488 | A1* | 12/2022 | Yu | H02M 7/00 |

FOREIGN PATENT DOCUMENTS

| | | |
|---|---|---|
| CN | 109768601 A | 5/2019 |
| CN | 210669562 U | 6/2020 |
| CN | 113422521 A | 9/2021 |

\* cited by examiner

FIG. 8 the communication control unit carries out the handshake communication with the external terminal device through the Lightning female socket;
the adapter control unit carries out protocol communication with the external terminal device through the Lightning female socket after completion of the handshake communication;
the adapter unit, after completion of the protocol communication and according to control of the adapter control unit, directly or indirectly provides the electrical energy corresponding to charging parameters to the Lightning female socket to charge the external terminal device.

Wherein, the preferred embodiment is that the adapter unit provides the electrical energy corresponding to the charging parameters to the Lightning female socket through the adapter control unit.

Wherein, the preferred embodiment is that a first control pin of the adapter control unit is connected to a first channel pin of the Lightning female socket, a handshake pin of the communication control unit is connected to an identification control pin of the Lightning female socket, an electrical energy output end of the adapter unit is directly or indirectly connected to a power pin of the Lightning female socket;
the communication control unit carries out the handshake communication with the external terminal device through the identification control pin of the Lightning female socket when the Lightning female socket is connected to the external terminal device;
the adapter control unit carries out the protocol communication with the external terminal device through the first channel pin of the Lightning female socket after the completion of the handshake communication;
the adapter unit, after the completion of the protocol communication and according to the control of the adapter control unit, directly or indirectly provides the electrical energy corresponding to the charging parameters to the power pin of the Lightning female socket to charge the external terminal device.

Wherein, the preferred embodiment is that a second control pin of the communication control unit is connected to the first channel pin of the Lightning female socket, and the communication control unit provides a power-on signal through the first channel pin of the Lightning female socket.

Wherein, the preferred embodiment is that a third control pin of the adapter control unit is connected to a second channel pin of the Lightning female socket, and the adapter control unit comprises a first protocol module and a second protocol module;
the first protocol module is connected to the first channel pin of the Lightning female socket through the first control pin and carries out a first protocol communication with the external terminal device through the first channel pin of the Lightning female socket; and
the second protocol module is connected to the second channel pin of the Lightning female socket through the third control pin and carries out a second protocol communication with the external terminal device through the second channel pin of the Lightning female socket.

Wherein, the preferred embodiment is that the adapter control unit controls the second protocol module to carry out the second protocol communication with the external terminal device through the Lightning female socket after the first protocol communication fails or when knowing that the first protocol communication is not supported by the external terminal device.

Wherein, the preferred embodiment is that the second protocol module comprises a DP pin and a DM pin, the second channel pin of the Lightning female socket comprises an L1P pin and an L1N pin, the DP pin is connected to the L1P pin, and the DM pin is connected to the L1N pin; and the first protocol module comprises a CC pin, the first channel pin of the Lightning female socket comprises an L0P pin, and the CC pin is connected to the L0P pin.

Wherein, the preferred embodiment is that the first protocol module is a PD protocol module and the second protocol module is a QC protocol module.

Wherein, the preferred embodiment is that the communication control unit further comprises a reset module, a reset pin of the reset module being connected to a reset circuit, the reset circuit comprising a reset end, a first capacitor, a first resistor and a second resistor, the reset pin being connected to the reset end, the first capacitor, the first resistor and the second resistor, respectively, the other ends of the first capacitor and the first resistor are grounded, and the other end of the second resistor is connected to the electrical energy output end of the adapter unit.

Wherein, the preferred embodiment is that the power adapter further comprises a USB female socket or/and a type-C female socket provided on the main body.

To solve the problems of the prior art, the present application also provides a charging device, which preferably includes a power adapter as described above and a charging cable, the charging cable including a wire segment, and a lightning male interface provided at one end of the wire segment and insertable into the lightning female socket, and an I/O interface provided at the other end of the wire segment.

Wherein, the preferred embodiment is that the I/O interface is a lightning male interface.

Wherein, the preferred embodiment is that the I/O interface is a type-C male interface.

Wherein, the preferred embodiment is that the I/O interface comprises one or more of a lightning male interface, a type-C male interface and a micro male interface.

To solve the problems of the prior art, the present application also provides a charging system, which preferably includes a power adapter as described above, a data cable and a terminal device, a Lightning male connector at one end of the data cable being inserted into the female Lightning socket of the power adapter, and an I/O port at the other end of the data cable being inserted into the terminal device.

Wherein, the preferred embodiment is that the data cable includes a data cable controller and a switching MOS tube connected to the data cable controller, a second control pin of the communication control unit is connected to a first channel pin of the Lightning female socket, the communication control unit provides a power-on signal through the first channel pin of the Lightning female socket, and the data cable controller conducts the switching MOS tube according to the power-on signal to cause the communication control unit to be in communication with the terminal device.

The beneficial effect of the present application is that, when compared with the prior art, the present application designs a power adapter with a Lightning female socket, a charging device and system to achieve communication with an external terminal device and charging to the outside through the Lightning female socket; by combining the Lightning female socket with the adapter unit, the communication control unit and the adapter control unit, the terminal device connected to the Lightning female socket is identified with the adapter and then the corresponding charging operation is performed according to the need, providing an achievable charging solution for the Lightning female socket as an electrical energy output port with high stability.

BRIEF DESCRIPTION OF THE DRAWINGS

The present application will be further described hereinafter in conjunction with the accompanying drawings and embodiments, in which.

DETAILED DESCRIPTION

Preferred embodiments of the present application are described in detail in conjunction with the accompanying drawings.

As shown in FIG. 1-FIG. 4, the present application provides the best embodiment of a power adapter.

Figure 1:
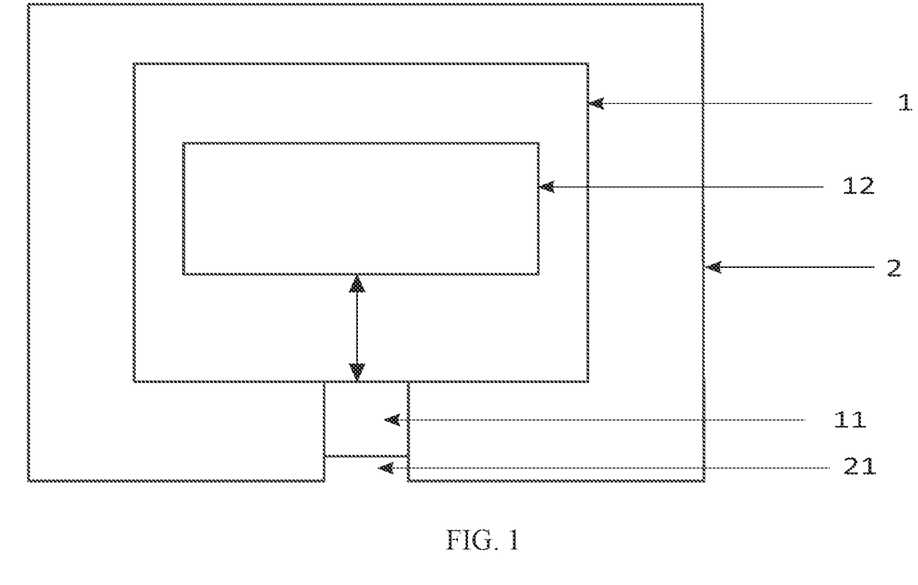
FIG. 1 is a first schematic diagram of the structure of a power adapter of the present application.

A power adapter with a Lightning female socket refers to FIG. 1, the power adapter including: a main body 1, the main body 1 is provided with a Lightning female socket 11 as an electrical energy output port and an adapter unit 12, the Lightning female socket 11 is electrically connected to the adapter unit 12;

a housing 2, the housing 2 is provided with an opening 21 communicated to the Lightning female socket 11, the housing 2 is sleeved on the exterior of the main body 1 and making the opening 21 correspond to the Lightning female socket 11; and wherein the adapter unit 12 is capable of providing electrical energy directly or indirectly to the Lightning female socket 11 and outputting voltage and current outwardly through the Lightning female socket 11.

Specifically, and referring to FIG. 1, the main body 1 is a circuit board, the circuit board is provided with a Lightning female socket 11, as an electrical energy output port, the Lightning female socket 11 is capable of supplying power to an external terminal device. The circuit board is also provided with an adapter unit 12, the Lightning female socket 11 is electrically connected to the adapter unit 12, the adapter unit 12 is capable of providing electrical energy directly or indirectly to the Lightning female socket 11 to charge an external terminal device.

Further, and referring to FIG. 1, the power adapter further includes a housing 2, the housing 2 is provided with an opening 21 communicated to the Lightning female socket 11, the main body 1 is provided within the housing 2 and makes the Lightning female socket 11 correspond to the opening 21.

Specifically, the adapter unit 12 is mainly used to rectify low frequency AC into DC, and then convert DC into high frequency AC signal, and then rectify it into DC by voltage transformation to achieve charging of external terminal device. The adapter unit 12 is provided within the housing 2, the opening 21 is opened on one side of the housing 2, the Lightning female socket 11 is connected to the adapter unit 12 and oriented towards the opening 21 of the housing 2 and is provided in correspondence with the opening 21, mainly for connecting to external terminal devices for supplying power to them.

Figure 2:
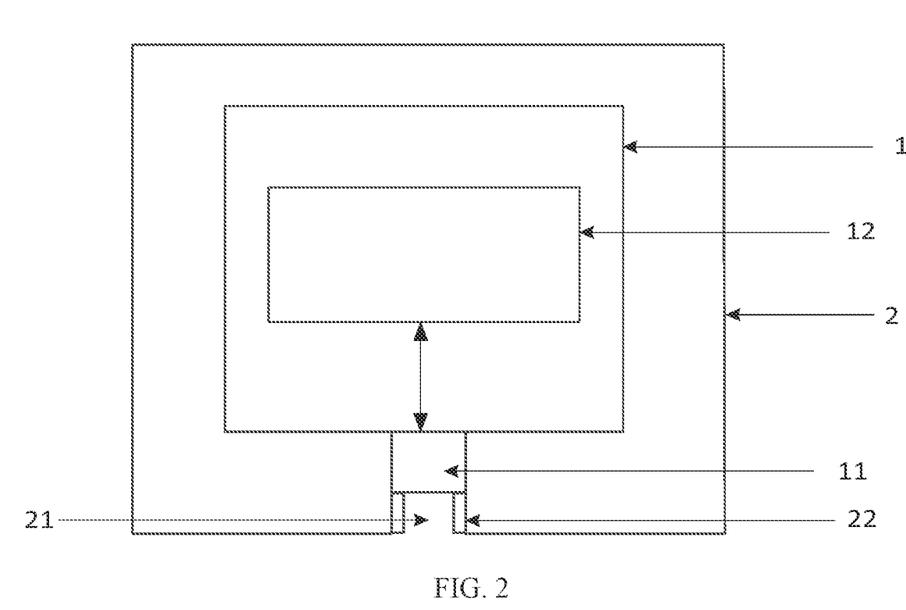
FIG. 2 is a second schematic diagram of the structure of a power adapter of the present application.

Referring to FIGS. 1 and 2, the present application provides two ways of setting the Lightning female socket 11.

Example 1

Referring to FIG. 1, the Lightning female socket 11 is connected to the adapter unit 12 and extends toward the side of the housing 2 and extends to the opening 21 on the side of the housing 2 and is positioned in correspondence with the opening 21.

Specifically, when the external data cable is inserted into the Lightning female socket 11, the Lightning male interface 32 at the external data cable interface extends into the Lightning female socket 11 of the power adapter with Lightning female socket and is connected to the adapter unit 12 inside the housing 2 through the Lightning female socket 11.

Example 2

Referring to FIG. 2, the housing 2 is further provided with a metal ring 22 for fixing the external data cable connector, the metal ring 22 being provided at the end of the opening 21 close to the outer side and corresponding to the end of the Lightning female socket 11.

Specifically, when the external data cable is inserted into the Lightning female socket 11, the Lightning male interface 32 at the external data cable interface extends into the Lightning female socket 11 of the power adapter with a Lightning female socket and is connected to the adapter unit 12 inside the housing 2 through the Lightning female socket 11, and is further fixed by the metal ring 22 on the outer side of the lightning female socket 11. In the prior art, the outer side of the Lightning female socket 11 is generally provided with a rubber ring to make the Lightning male interface 32 more stable for insertion into the Lightning female socket 11. However, the rubber ring is a soft ring, when the Lightning male interface 32 is inserted into the Lightning female socket 11, it is easy to sway from side to side. On one hand, the present embodiment further improves the stability of the Lightning male interface 32 when inserted into the Lightning female socket 11 by setting a metal ring 22 at the end of on the outer side of the Lightning female socket 11, which is harder and, on the other hand, can also effectively prevent the external data cable from cracking due to bending during the charging, further effectively prevents the Lightning female socket 11 from being disconnected from the cable body.

Figure 3:
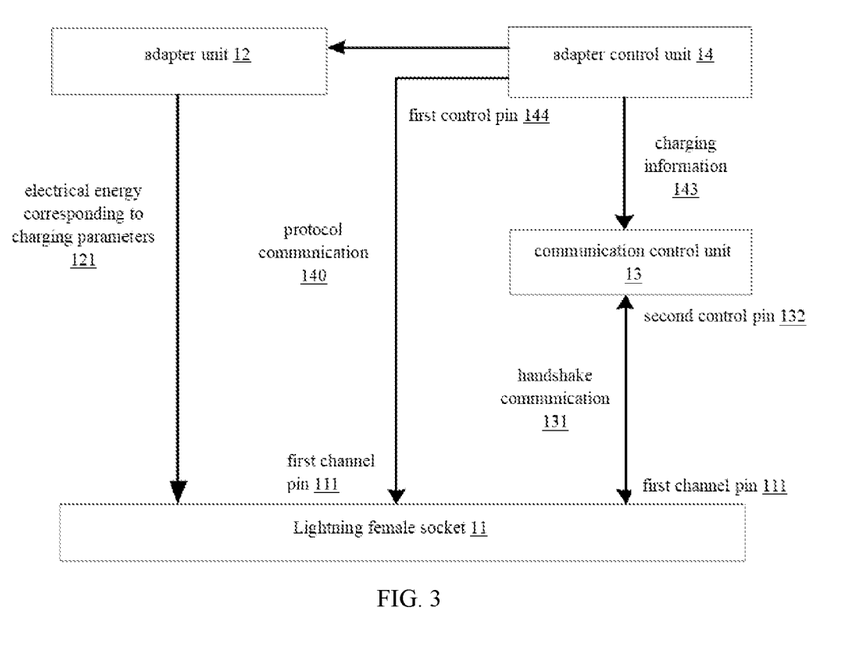
FIG. 3 is a third schematic diagram of the structure of a power adapter of the present application.

Further, and referring to FIG. 3, the main body 1 is further provided with a communication control unit 13 and an adapter control unit 14, the communication control unit 13 being connected to the adapter control unit 14, the adapter unit 12 and the lightning female socket 11, respectively.

When the Lightning female socket 11 is connected to an external terminal device, the communication control unit 13 carries out handshake communication with the external terminal device through the Lightning female socket 11; the adapter control unit 14 carries out protocol communication with the external terminal device through the Lightning female socket 11 after completion of the handshake communication; the adapter unit 12, after completion of the protocol communication and according to control of the adapter control unit 14, directly or indirectly provides the electrical energy corresponding to charging parameters to the Lightning female socket 11 to charge the external terminal device.

Specifically, the second control pin of the communication control unit 13 is connected to the first channel pin 111 of the Lightning female socket 11, the communication control unit 13 provides the power-on signal through the first channel pin 111 of the Lightning female socket 11, and when the Lightning female socket 11 is connected to an external terminal device, handshake communication 131 is carried out. Firstly, the communication control unit 13 directly carries out the handshake communication 131 with the terminal device to prepare the communication for fast charging of the terminal device by the adapter unit 12; and, after the completion of the handshaking communication 131 and after confirming the successful communication in accordance with the requirements, the adapter unit 12, after the completion of the protocol communication 140 and according to the control of the adapter control unit 14, directly or indirectly provides the electrical energy corresponding to the charging parameters 121 to the Lightning female socket 11 to charge the external terminal device.

Further, the first control pin 144 of the adapter control unit 14 is connected to the first channel pin 111 of the Lightning female socket 11, the handshake pin 133 of the communication control unit 13 is connected to the identification control pin 112 of the Lightning female socket 11, and the electrical energy output end of the adapter unit 12 is directly or indirectly connected to the power pin of the Lightning female socket 11; wherein the communication control unit 13 carries out handshake communication 131 with the external terminal device through the identification control pin 112 of the Lightning female socket 11 when the Lightning female socket 11 is connected to the external terminal device; the adapter control unit 14 carries out protocol communication 140 with the external terminal device through the first channel pin 111 of the Lightning female socket 11 after the completion of the handshake communication 131; the adapter unit 12 carries out protocol communication MO with the external terminal device after completing the protocol communication 140 and according to the control of the adapter control unit 14, the adapter unit 12, after the completion of the protocol communication 140 and according to the control of the adapter control unit 14, directly or indirectly provides the electrical energy corresponding to the charging parameters 121 to the power pin of the Lightning female socket 11 to charge the external terminal device.

The adapter unit 12 is mainly used to connect to the power supply, which is the source of providing electrical energy, such as mains supply outlets, etc. The adapter unit 12 converts the electrical energy provided by the power supply into electrical energy that can be supplied to the adapter itself, as well as that can be supplied to the outside through the Lightning female socket 11. At the same time, the adapter unit 12 provides electric energy with different voltage values and current values to provide required charging electric energy for external terminal devices, so as to realize normal charging, fast charging and other operations.

Figure 4:
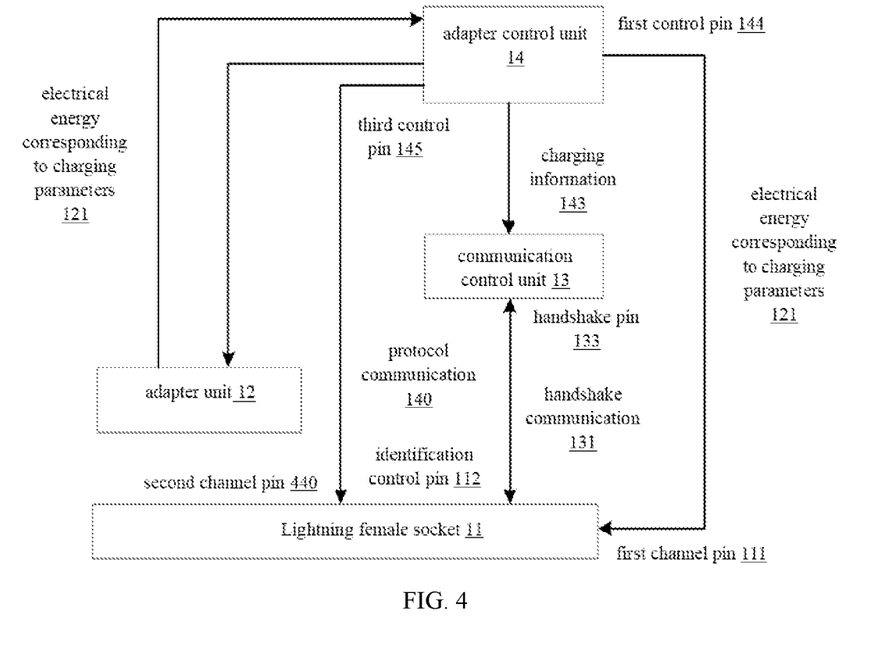
FIG. 4 is a fourth schematic diagram of the structure of a power adapter of the present application.

Preferably, and referring to FIG. 4, the adapter unit 12 provides the electrical energy corresponding to the charging parameters 121 for the Lightning female socket 11 through the adapter control unit 14, and the adapter control unit 14 serves as the regulation of the output electrical energy to provide the best electrical energy output operation to meet the charging requirements of the terminal device.

Wherein, it is generally considered that connection of the Lightning female socket 11 and the external terminal device is to connect the Lightning female socket 11 with the external terminal through a data cable, one end of which is a Lightning male connector that can be inserted into the Lightning female socket 11, and the other end of which is a charging connector that can be inserted into the charging port of the external terminal; wherein the electrical energy output positive electrode of the adapter unit is connected to the electrical energy input positive electrode of the terminal device through the power pin of the Lightning female socket 11, the power pin of the Lightning male connector, the power cord of the data cable, and the electrical energy output positive electrode of the charging connector.

Wherein, handshake protocol refers to a type of network protocol mainly used to allow the client end and the server to confirm each other's identity. After the communication control unit 13 is powered on and detects the Lightning female socket 11 is connected to the external terminal device, it first carries out handshake communication 131 with the external terminal device through the handshake module of the communication control unit 13 to determine whether the external terminal device belongs to a device that can carry out protocol fast charging or a device that is a recorded device. In one embodiment, the communication control unit 13 includes a first chip and a peripheral circuit. Interaction with the external terminal device through the Lightning female socket 11 is achieved by additionally setting a chip (IC) to achieve efficient and accurate communication with the external terminal device, and at the same time, on the basis of the adapter control unit 14 of the adapter, the design of adding the first chip to form the communication control unit 13, on the one hand, can simplify the design of the adapter regarding the adapter control unit 14, on the other hand, achieves a modular layout, improves the mass production of the circuit structure, reduces production costs, and achieves functional distribution. In particular, by integrating a specific function in the first chip, the chip having a dedicated function is designed and produced, to avoid the waste of chip functions and reduce costs. Wherein, software burning is carried out for the first chip by using a plurality of pins of the first chip as burning pins. Preferably, the handshake module is connected to the ID pin of the Lightning female socket 11 through a communication pin of the first chip, and a resistor is provided between the first chip and the Lightning female socket 11.

Wherein, the above terminal device can be a cell phone, tablet, computer, smart wear and other devices.

Figure 5:
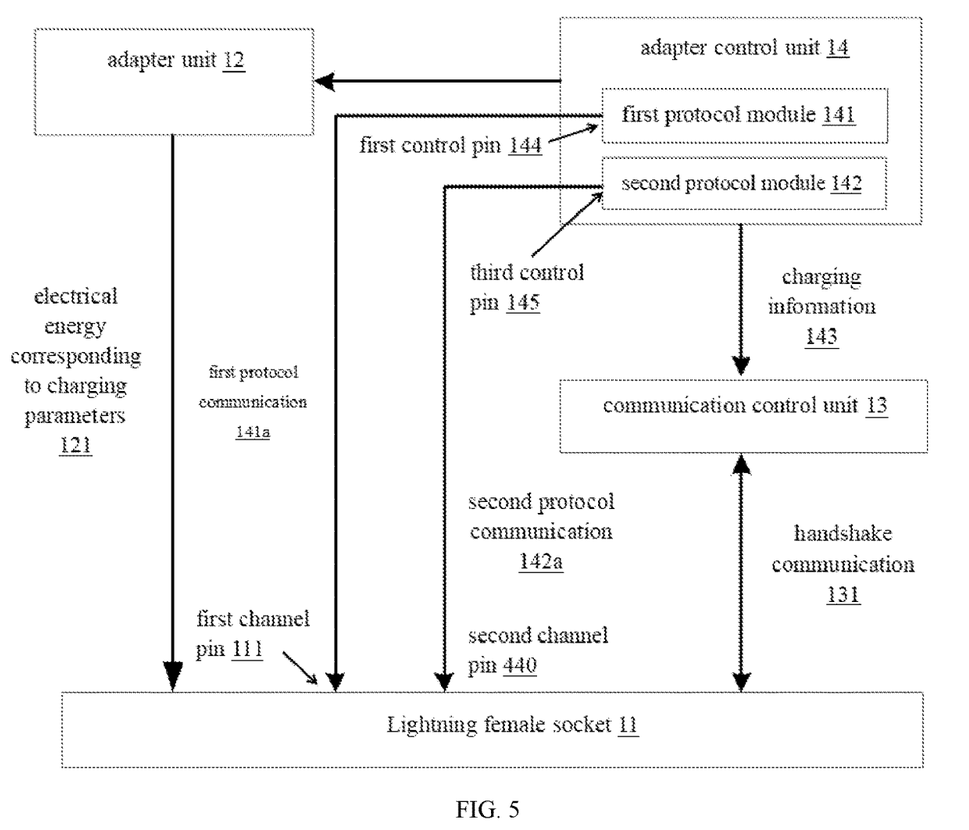
FIG. 5 is a schematic diagram of the structure of the protocol communication in the present application.

As shown in FIG. 5, the present application provides a preferred embodiment of the protocol communication.

A third control pin of the adapter control unit 14 is connected to a second channel pin 440 of the Lightning female socket 11, and the adapter control unit 14 includes a first protocol module 141 and a second protocol module 142; wherein the first protocol module 141 is connected to the first channel pin 111 of the Lightning female socket 11 through the first control pin 144 and carries out a first protocol communication 141a with the external terminal device through the first channel pin 111 of the Lightning female socket 11; and the second protocol module 142 is connected to the second channel pin 440 of the Lightning female socket 11 through the third control pin 145 and carries out a second protocol communication 142a with the external terminal device through the second channel pin 440 of the Lightning female socket 11.

The first protocol module 141 is a PD protocol module, and the first protocol module 141 communicates with the external terminal device via Lightning female socket 11 for PD protocol. PD charging protocol is a power transfer protocol announced by the USB-IF organization, which can increase the default maximum power of the current 5V/2 A type-c interface to 100 W, while Google announced that fast charging protocols equipped with Android 7.0 or higher phones must support PD protocols, which is intended to unify the fast charging market. USBPD increases power delivery through USB cables and connectors, extending the cable bus power capability in USB applications, the specification allows for higher voltages and currents, delivering power up to 100 watts, and the freedom to change the direction of power delivery. Of course, the first protocol module 141 can also be other communication protocols.

In one embodiment, the adapter control unit 14 controls the second protocol module 142 to carry out the second protocol communication with the external terminal device through the Lightning female socket 11 after the first protocol communication fails or when knowing that the first protocol communication is not supported by the external terminal device. The second protocol module 142 includes a DP pin and a DM pin, the second channel pin of the Lightning female socket 11 include a L1P pin and a L1N pin, the DP pin is connected to the L1P pin, and the DM pin is connected to the L1N pin; and the first protocol module 141 includes a CC pin, the first channel pin of the Lightning female socket 11 includes an L0P pin, and the CC pin is connected to the L0P pin. Wherein, the adapter control unit 14 controls the second protocol module 142 to carry out the second protocol communication with the external terminal device through the Lightning female socket 11 after the first protocol communication fails or when knowing that the fast charging is not supported by the external terminal device. On the one hand, the applicability of the adapter is improved, increasing external terminal devices with which the Lightning female socket 11 can be paired, on the other hand, different female socket interfaces can be set on the adapter, the second protocol module 142 is for the use of these additional female socket interface, and can be then used on the Lightning female socket 11, to achieve one function multiplexing.

Wherein, the second protocol module 142 includes a DP pin and a DM pin, the second channel pin of the Lightning female socket 11 include a L1P pin and a L1N pin, the DP pin is connected to the L1P pin, and the DM pin is connected to the L1N pin. As well, the second protocol module 142 is a QC protocol module, and the second protocol module 142 carries out QC protocol communication with the external terminal device through the Lightning female socket 11. The device outputs voltage signals to the charger through the USB data communication port D+ and D−, and the charger has a built-in USB decoder chip that determines the voltage the charger needs to output. There are no special requirements for the charging USB cable.

Further, the adapter control unit 14 preferably includes a second chip and its peripheral circuit, integrated design is carried out through the second chip. Of course, a logic circuit can also be set up to achieve the relevant control functions.

Figure 6:
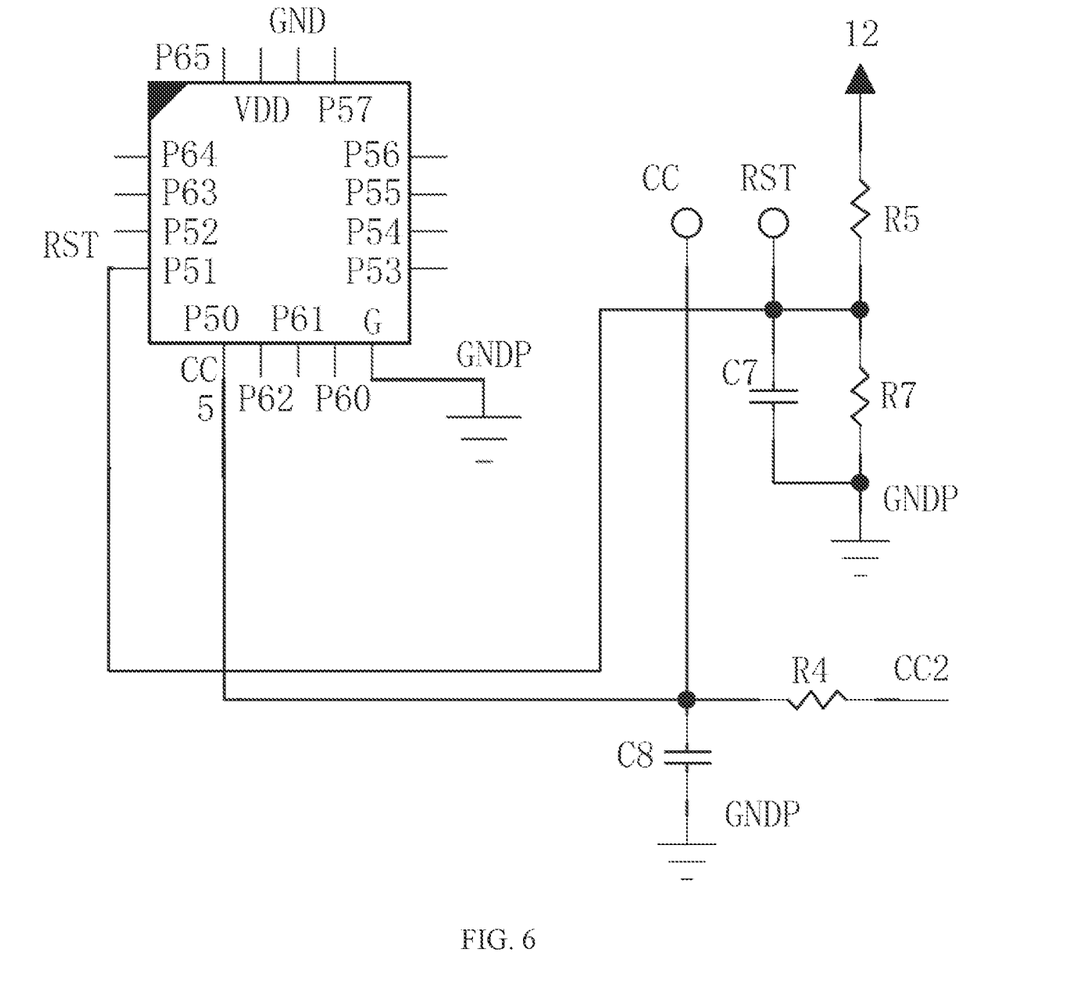
FIG. 6 is a circuit diagram of a reset module in the present application.

As shown in FIG. 6, the present application provides a preferred embodiment of the reset module.

the communication control unit 13 further includes a reset module, a reset pin of the reset module being connected to a reset circuit, the reset circuit comprising a reset end, a first capacitor, a first resistor and a second resistor, the reset pin being connected to the reset end, the first capacitor, the first resistor and the second resistor, respectively, the other ends of the first capacitor and the first resistor are grounded, and the other end of the second resistor is connected to the electrical energy output end of the adapter unit 12.

Specifically, U1 on the left is the first chip, and pin P51 on the first chip is used as the reset pin of the reset module, and is connected to the reset circuit through the reset pin, and the reset circuit includes the reset terminal RST, the first capacitor C7, the first resistor R7 and the second resistor R5 connected to the reset pin, and the other end of the second resistor R5 is connected to the electrical energy output end VOUTL of the adapter unit 12, and the first chip is controlled to carry out relevant communication operations, such as handshake communication, through power-on reset initialization.

Figure 7:
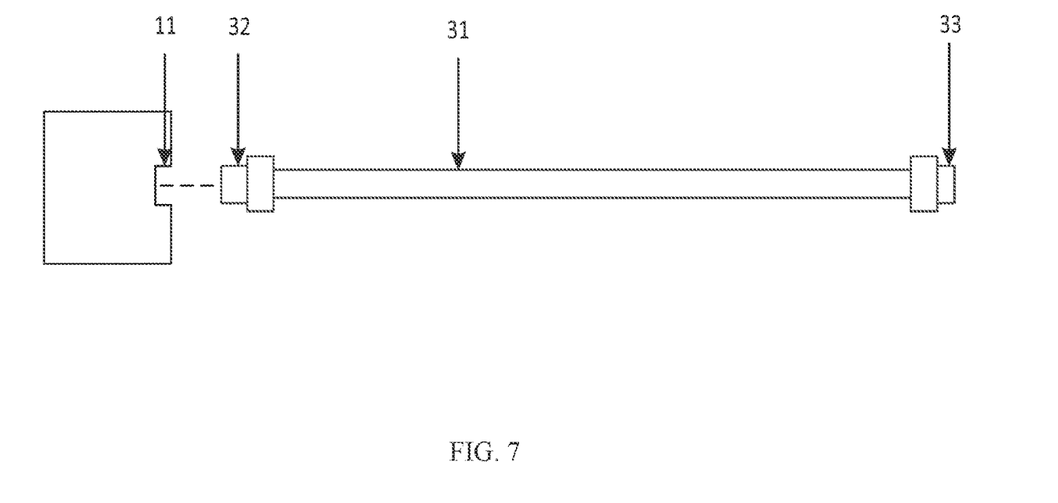
FIG. 7 is a schematic diagram of the structure of a charging device in the present application.

The present application provides a best embodiment of a charging device as shown in FIG. 7.

A charging device, with reference to FIG. 7, the charging device includes a power adapter as described above and a charging cable, the charging cable includes a wire segment 31, and a Lightning male interface 32 provided at one end of the wire segment 31 and insertable into a Lightning female socket 11, and an I/O interface 33 provided at the other end of the wire segment 31.

Specifically, the charging cable is mainly used to connect a power adapter with a Lightning female socket and an external device to enable charging of the external device, the charging cable having a Lightning male interface 32 provided at one end for use with the power adapter with a Lightning female socket, and an I/O interface 33 provided at the other end thereof for connection to the external device unit. Wherein, it is noted that the Lightning male interface 32 of the charging cable can either be connected with the power adapter with a Lightning female socket to obtain electrical energy to charge the external device or can be connected with other different external devices for data transfer or power transfer between two devices.

Example 1

The I/O interface 33 is a Lightning interface for connection to an external device.

Specifically, the data cable has a Lightning male interface 32 at one end and a Lightning interface at its other end. Specifically, the Lightning interface also refers to a Lightning male interface 32, and the data cable with dual Lightning male interfaces 32 can be connected to the power adapter with Lightning female socket and the external device respectively to charge the external device, and can also be connected to two external devices with Lightning female sockets 11 respectively to achieve data transfer or power transfer between the two external devices.

Example 2

The I/O interface 33 is a type-C interface for connection with external devices.

Specifically, the data cable has a Lightning male interface 32 at one end and a type-C interface at its other end. Specifically, the type-C interface refers to the type-C male interface. The data cable can be connected to the power adapter with Lightning female socket and the external device respectively to charge the external device, and can also be connected to the external device with a Lightning female socket 11 and the external device with a type-C female socket respectively to achieve data transfer or power transfer between the two external devices.

Example 3

The I/O interface 33 includes one or more of Lightning interface, type-C interface and micro interface, and the external device can be connected to the charging device through the Lightning interface, type-C interface or micro interface for charging.

Specifically, the data cable has a Lightning male interface 32 at one end and a multi-interface end at its other end, specifically including one or more of a Lightning interface, a type-C interface, and a micro interface. The Lightning interface, type-C interface, and micro interface specifically refers to Lightning male interface 32B1, a type-C male interface and micro male interface, the data cable can be connected to the power adapter with a Lightning female socket and two different external devices, respectively, to achieve charging of two different external devices separately or simultaneously, and can also be connected to the external device with a Lightning female socket 11 and two other external devices with Lightning interface, type-C interface or micro interface respectively to achieve data transfer or power transfer between multiple external devices with different female sockets.

Wherein, it is noted that the solution of one or more of the Lightning interface, type-C interface and micro interface includes a solution having both a Lightning interface and a type-C interface, a solution having both a Lightning interface and a micro interface, a solution having both a type-C interface and a micro interface, and a solution having a Lightning interface, a type-C interface and a micro interface.

Further, the charging cable is provided with a protection unit for preventing backflow of current.

Specifically, since both ends of the charging cable can be connected to external devices, when one of the external devices is charging another external device, and when the power of the two external devices is constantly changing, it will be possible to induce the backflow of current, and in order to prevent the devices from being damaged due to the backflow of current between two different external devices, the charging cable in the embodiment is also provided with a protection unit.

Further, a bi-directional power adapter unit is provided on the charging cable, and the bi-directional power adapter unit is used to interchange the roles of the charging device and the device being charged.

Specifically, the bi-directional power adaptation unit may refer to a specific bi-directional charging circuit, or may refer to a bi-directional charging protocol with default rules that allows both data or power transfer from the first external device to the second external device and data or power transfer from the second external device to the first external device to improve the utility of the overall data cable.

Figure 8:
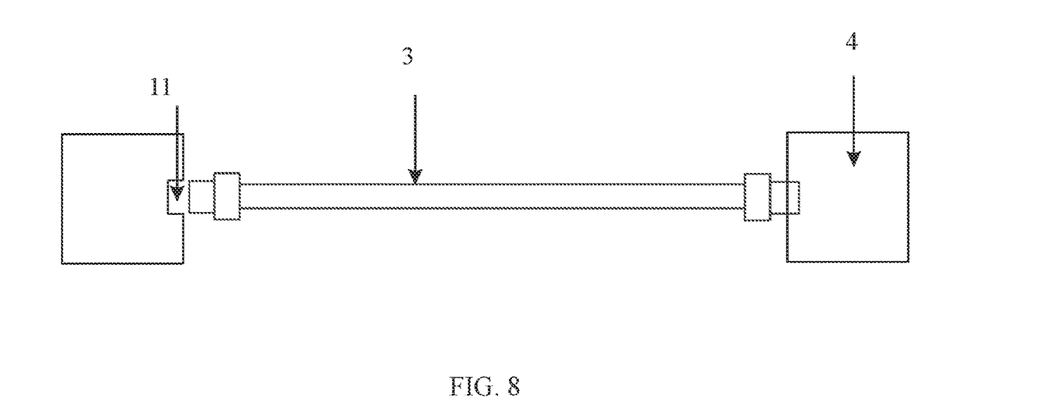
FIG. 8 is a schematic diagram of the structure of a charging system in the present application.

As shown in FIG. 8, the present application provides a best embodiment of a charging system. A charging system, with reference to FIG. 8, includes a power adapter as described above, a data cable 3, and a terminal device 4, a Lightning male connector at one end of the data cable 3 is inserted into a Lightning female socket 11 of the power adapter, and an I/O port at the other end of the data cable is inserted into the terminal device 4.

In one embodiment, the power adapter further includes other I/O interfaces, such as USB interface and type-c interface, so that the power adapter has multiple interfaces, which is adaptable and improves the user experience.

The data cable includes a data cable controller and a switching MOS tube connected to the data cable controller, the second control pin of the communication control unit 13 is connected to a first channel pin of the Lightning female socket 11, the communication control unit 13 provides a power-on signal through the first channel pin of the Lightning female socket 11, and the data cable controller conducts the switching MOS tube according to the power-on signal to cause the communication control unit to be in communication with the terminal device.

Therefore, when the power adapter is powered on, i.e., when the communication control unit 13 is powered on, through the power-on signal, the first channel pin of the Lightning female socket 11 generates a power-on signal, while the data cable controller conducts the switching MOS tube according to the power-on signal to cause the communication control unit to be in communication with the terminal device; and, after the communication control unit 13 is communicatively connected to the terminal device, the communication control unit 13 immediately carries out handshake communication with the terminal device, and after the handshake communication is completed, the first protocol communication is carried out to realize the outward charging of the Lightning female socket 11, and thus realize the fast charging of the Lightning female socket 11.

The above mentioned is only the best implementation of the present application, not to limit the scope of the present application, and all equivalent changes or modifications made according to the scope of the claims of the present application are covered by the present application.

What is claimed is:

1. A power adapter with a Lightning female socket, comprising:
   a main body, the main body being provided with an input/output interface of type Lightning (Lightning) female socket as an electrical energy output port and an adapter unit, the Lightning female socket being electrically connected to the adapter unit; and
   a housing, the housing being provided with an opening communicated to the Lightning female socket, the housing being sleeved on an exterior of the main body, and making the opening correspond to the Lightning female socket;
   wherein the adapter unit is capable of providing electrical energy directly or indirectly to the Lightning female socket and outputting voltage and current outwardly through the Lightning female socket.

2. The power adapter according to claim 1, wherein the power adapter further comprises a USB female socket or/and a type-C female socket provided on the main body.

3. A charging device, comprising: the power adapter according to claim 1 and a charging cable, the charging cable comprising a wire segment, and a Lightning male interface provided at one end of the wire segment and insertable into the Lightning female socket, and an I/O interface provided at the other end of the wire segment.

4. The charging device according to claim 3, wherein the I/O interface is a Lightning male interface.

5. The charging device according to claim 3, wherein the I/O interface is a type-C male interface.

6. The charging device according to claim 3, wherein the I/O interface comprises one or more of a Lightning male interface, a type-C male interface and a micro male interface.

7. A charging device according to claim 3, wherein the main body is further provided with a communication control unit and an adapter control unit, the communication control unit being connected to the adapter control unit, the adapter unit and the Lightning female socket, respectively;
   wherein when the Lightning female socket is connected to an external terminal device, the communication control unit carries out handshake communication with the external terminal device through the Lightning female socket;
   the adapter control unit carries out protocol communication with the external terminal device through the Lightning female socket after completion of the handshake communication;
   the adapter unit, after completion of the protocol communication and according to control of the adapter control unit, directly or indirectly provides the electrical energy corresponding to charging parameters to the Lightning female socket to charge the external terminal device.

8. A charging device according to claim 7, wherein a first control pin of the adapter control unit is connected to a first channel pin of the Lightning female socket, a handshake pin of the communication control unit is connected to an identification control pin of the Lightning female socket, an electrical energy output end of the adapter unit is directly or indirectly connected to a power pin of the Lightning female socket;
   wherein the communication control unit carries out the handshake communication with the external terminal device through the identification control pin of the Lightning female socket when the Lightning female socket is connected to the external terminal device;
   the adapter control unit carries out the protocol communication with the external terminal device through the first channel pin of the Lightning female socket after the completion of the handshake communication;
   the adapter unit, after the completion of the protocol communication and according to the control of the adapter control unit, directly or indirectly provides the electrical energy corresponding to the charging parameters to the power pin of the Lightning female socket to charge the external terminal device.

9. A charging device according to claim 8, wherein a second control pin of the communication control unit is connected to the first channel pin of the Lightning female socket, and the communication control unit provides a power-on signal through the first channel pin of the Lightning female socket.

10. A charging device according to claim 8, wherein a third control pin of the adapter control unit is connected to a second channel pin of the Lightning female socket, and the adapter control unit comprises a first protocol module and a second protocol module;
    wherein the first protocol module is connected to the first channel pin of the Lightning female socket through the first control pin and carries out a first protocol communication with the external terminal device through the first channel pin of the Lightning female socket; and
    the second protocol module is connected to the second channel pin of the Lightning female socket through the third control pin and carries out a second protocol communication with the external terminal device through the second channel pin of the Lightning female socket.

11. A charging system, comprising: the power adapter according to claim 1, a data cable and a terminal device, a Lightning male connector at one end of the data cable being inserted into the female Lightning socket of the power adapter, and an I/O port at the other end of the data cable being inserted into the terminal device.

12. The charging system according to claim 11, wherein the data cable comprises a data cable controller and a switching MOS tube connected to the data cable controller, a second control pin of a communication control unit is connected to a first channel pin of the Lightning female socket, the communication control unit provides a power-on signal through the first channel pin of the Lightning female socket, and the data cable controller conducts the switching MOS tube according to the power-on signal to cause the communication control unit to be in communication with the terminal device.

13. The power adapter according to claim 1, wherein the main body is further provided with a communication control unit and an adapter control unit, the communication control unit being connected to the adapter control unit, the adapter unit and the Lightning female socket, respectively;
wherein when the Lightning female socket is connected to an external terminal device, the communication control unit carries out handshake communication with the external terminal device through the Lightning female socket;
the adapter control unit carries out protocol communication with the external terminal device through the Lightning female socket after completion of the handshake communication;
the adapter unit, after completion of the protocol communication and according to control of the adapter control unit, directly or indirectly provides the electrical energy corresponding to charging parameters to the Lightning female socket to charge the external terminal device.

14. The power adapter according to claim 13, wherein the communication control unit further comprises a reset module, a reset pin of the reset module being connected to a reset circuit, the reset circuit comprising a reset end, a first capacitor, a first resistor and a second resistor, the reset pin being connected to the reset end, the first capacitor, the first resistor and the second resistor, respectively, the other ends of the first capacitor and the first resistor are grounded, and the other end of the second resistor is connected to an electrical energy output end of the adapter unit.

15. The power adapter according to claim 13, wherein the adapter unit provides the electrical energy corresponding to the charging parameters to the Lightning female socket through the adapter control unit.

16. The power adapter according to claim 15, wherein a first control pin of the adapter control unit is connected to a first channel pin of the Lightning female socket, a handshake pin of the communication control unit is connected to an identification control pin of the Lightning female socket, an electrical energy output end of the adapter unit is directly or indirectly connected to a power pin of the Lightning female socket;
wherein the communication control unit carries out the handshake communication with the external terminal device through the identification control pin of the Lightning female socket when the Lightning female socket is connected to the external terminal device;
the adapter control unit carries out the protocol communication with the external terminal device through the first channel pin of the Lightning female socket after the completion of the handshake communication;
the adapter unit, after the completion of the protocol communication and according to the control of the adapter control unit, directly or indirectly provides the electrical energy corresponding to the charging parameters to the power pin of the Lightning female socket to charge the external terminal device.

17. The power adapter according to claim 13, wherein a first control pin of the adapter control unit is connected to a first channel pin of the Lightning female socket, a handshake pin of the communication control unit is connected to an identification control pin of the Lightning female socket, an electrical energy output end of the adapter unit is directly or indirectly connected to a power pin of the Lightning female socket;
wherein the communication control unit carries out the handshake communication with the external terminal device through the identification control pin of the Lightning female socket when the Lightning female socket is connected to the external terminal device;
the adapter control unit carries out the protocol communication with the external terminal device through the first channel pin of the Lightning female socket after the completion of the handshake communication;
the adapter unit, after the completion of the protocol communication and according to the control of the adapter control unit, directly or indirectly provides the electrical energy corresponding to the charging parameters to the power pin of the Lightning female socket to charge the external terminal device.

18. The power adapter according to claim 17, wherein a second control pin of the communication control unit is connected to the first channel pin of the Lightning female socket, and the communication control unit provides a power-on signal through the first channel pin of the Lightning female socket.

19. The power adapter according to claim 17, wherein a third control pin of the adapter control unit is connected to a second channel pin of the Lightning female socket, and the adapter control unit comprises a first protocol module and a second protocol module;
wherein the first protocol module is connected to the first channel pin of the Lightning female socket through the first control pin and carries out a first protocol communication with the external terminal device through the first channel pin of the Lightning female socket; and
the second protocol module is connected to the second channel pin of the Lightning female socket through the third control pin and carries out a second protocol communication with the external terminal device through the second channel pin of the Lightning female socket.

20. The power adapter according to claim 19, wherein the adapter control unit controls the second protocol module to carry out the second protocol communication with the external terminal device through the Lightning female socket after the first protocol communication fails or when knowing that the first protocol communication is not supported by the external terminal device.

* * * * *